US 10,099,775 B2

(12) United States Patent
Turpin et al.

(10) Patent No.: US 10,099,775 B2
(45) Date of Patent: Oct. 16, 2018

(54) AUTOPILOT SYSTEM FOR AN AIRCRAFT AND RELATED PROCESS

(71) Applicant: DASSAULT AVIATION, Paris (FR)

(72) Inventors: Arnaud Turpin, Boulogne Billancourt (FR); Nicolas Le Corre, Paris (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/203,605

(22) Filed: Jul. 6, 2016

(65) Prior Publication Data

US 2017/0008613 A1    Jan. 12, 2017

(30) Foreign Application Priority Data

Jul. 10, 2015    (FR) ...................................... 15 01473

(51) Int. Cl.
   *B64C 13/18*      (2006.01)
   *G05D 1/00*       (2006.01)
   *G05D 1/08*       (2006.01)
   *G05D 1/04*       (2006.01)

(52) U.S. Cl.
   CPC ........... *B64C 13/18* (2013.01); *G05D 1/0055* (2013.01); *G05D 1/0061* (2013.01); *G05D 1/042* (2013.01); *G05D 1/0808* (2013.01)

(58) Field of Classification Search
   CPC .... B64C 13/18; G05D 1/0055; G05D 1/0061; G05D 1/042; G05D 1/0808
   See application file for complete search history.

(56) References Cited

U.S. PATENT DOCUMENTS

| 4,924,401 | A | * | 5/1990 | Bice | ..................... G05D 1/0646 244/181 |
| 5,722,620 | A | * | 3/1998 | Najmabadi | ............. B64C 13/16 244/181 |
| 5,884,870 | A | | 3/1999 | Maffre et al. | |
| 2012/0022723 | A1 | | 1/2012 | Botargues et al. | |

FOREIGN PATENT DOCUMENTS

WO    WO 2005/083540 A1    9/2005

OTHER PUBLICATIONS

French Search Report of priority application FR 15 01473.

* cited by examiner

*Primary Examiner* — Aaron L Troost
(74) *Attorney, Agent, or Firm* — Davidson, Davidson & Kappel, LLC

(57) ABSTRACT

An autopilot system for an aircraft and related process are provided. The system includes a first load factor command definition and application module; a second roll command definition and application module; a control module of the first definition and application module and the second definition and application module, able to define parameters of a recovery maneuver seeking to return the aircraft to setpoint attitudes at the end of a maneuver from initial attitudes. The control module includes a submodule for computing at least one pair of authorities respectively applied by the first module and by the second module during the recovery maneuver. The authorities are computed as a function of at least a current movement parameter of the aircraft and a safety parameter.

19 Claims, 4 Drawing Sheets

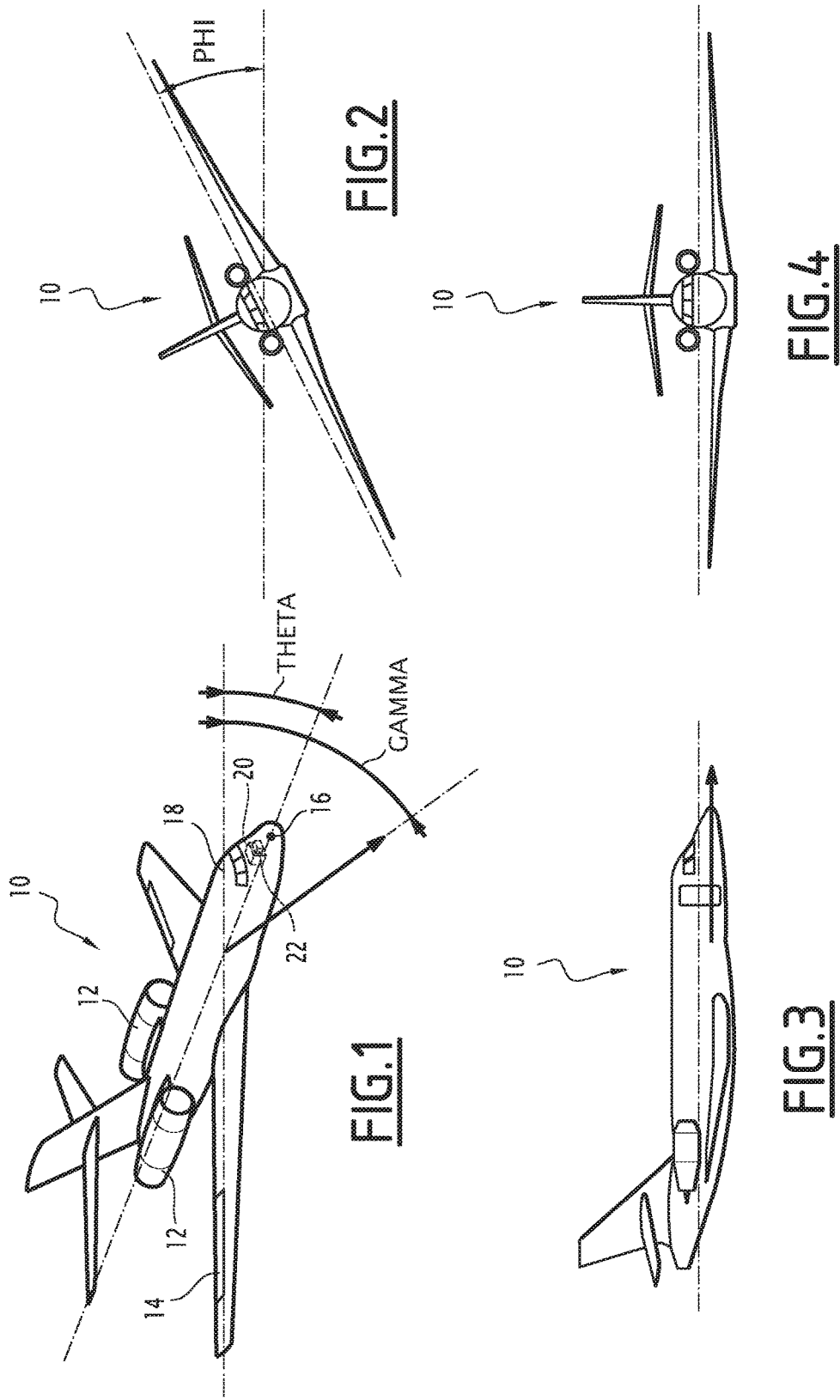

AUTOPILOT SYSTEM FOR AN AIRCRAFT AND RELATED PROCESS

This claims the benefit of French Patent Application FR 15 01473, filed Jul. 10, 2015 and hereby incorporated by reference herein.

The present invention relates to an autopilot system for an aircraft comprising:
- a first load factor command definition and application module;
- a second roll command definition and application module;
- a control module of the first definition and application module and the second definition and application module, able to define parameters of a recovery maneuver seeking to return the aircraft to setpoint attitudes at the end of a maneuver from initial attitudes.

Such a system is intended to improve the functionalities of a traditional aircraft autopilot system, to add an operating mode making it possible to execute a recovery maneuver returning the airplane to normal flight attitudes, on command by the crew or automatically.

BACKGROUND

Aircraft autopilot systems generally make it possible to keep the aircraft on a trajectory and with a pre-established speed by developing and sending orders to control surfaces of the aircraft.

These systems lighten the workload of the crew, and allow the crew to focus on tasks other than keeping the aircraft in flight along a given trajectory.

Generally, the autopilot system operates in a given movement domain of the aircraft, in particular regarding the angle of climb and bank angle. When the aircraft is outside this movement domain, the aircraft is piloted manually and the autopilot system is deactivated.

To ensure that the flight is conducted in complete safety, the crew must see, at all times and in three dimensions, the current movement of the aircraft, in particular in terms of angle of climb, pitch attitude, and bank angle. This allows him to take appropriate measures to maintain the attitudes of the aircraft, or on the contrary to modify them when necessary to conduct the flight.

Under certain extreme conditions, the crew of the aircraft may be spatially disoriented, due to outside events or through a simple loss of spatial perception of the attitudes of the aircraft. For example, when the aircraft moves through fog, the crew may find itself without outside references and therefore be disoriented.

Such disorientation sometimes leads the crew to make piloting decisions affecting the proper conduct of the flight, or even undermining its safety.

To offset this problem, some known avionics systems provide a particular autopilot mode, which can be activated upon pressing a specific button in the cockpit, to perform a recovery maneuver. This maneuver generally consists of leveling the wings, to obtain a zero bank angle and level the aircraft again with a zero angle of climb. The crew may then resume control of the aircraft.

SUMMARY OF THE INVENTION

Such a system is not fully satisfactory. First of all, this system can only be deactivated in the flight domain in which the autopilot can be triggered. Furthermore, the maneuver is done with an inclusive authority, irrespective of the initial movement conditions of the aircraft.

In some cases, the recovery maneuver leads to a potential departure from the speed domain of the aircraft, dropping below a safe altitude. More generally, the maneuver often creates discomfort for the occupants of the aircraft, who experience unpleasant accelerations, while the severity of the situation does not necessarily require such accelerations.

One aim of the invention is to provide a system making it possible to return the aircraft to predetermined setpoint attitudes in case of disorientation of the crew, while minimizing the risk of the aircraft leaving its traditional flight domain, and minimizing discomfort for occupants of the aircraft.

To that end, the invention provides to a system of the aforementioned type, wherein the control module includes a submodule for computing at least one pair of authorities respectively applied by the first definition and application module and by the second definition and application module during the recovery maneuver, the authorities being computed based on at least one current movement parameter of the aircraft and a safety parameter.

The system according to the invention may comprise one or more of the following features, considered alone or according to any technically possible combination:
- the safety parameter is chosen from among a maximum operating speed, or a safety altitude;
- each applied authority is computed to assume a value comprised between a traditional autopilot authority of the aircraft and a maximum manual piloting authority of the aircraft;
- the or each movement parameter of the aircraft is determined successively during the maneuver, the computing submodule being able to compute at least one pair of authorities, based on the or each current movement parameter;
- the movement parameter is chosen from among the angle of climb, the bank angle, the calibrated airspeed, and/or the altitude of the aircraft;
- the predetermined end-of-maneuver setpoint attitudes are a zero angle of climb and a zero bank angle;
- the computing submodule is configured to compute a pair of authorities applied as a function of a measured calibrated airspeed of the aircraft, the safety parameter advantageously being a maximum operating speed of the aircraft;
- the computing submodule is able to determine the first pair of authorities applied based on a first law of authorities as a function of a measured calibrated airspeed of the aircraft, the first law of authorities being determined from at least one pair of reference authorities, advantageously from at least three pairs of reference authorities;
- the computing submodule is configured to compute a second pair of authorities applied as a function of a measured altitude of the aircraft, the safety parameter advantageously being a safe altitude;
- the computing submodule is able to determine the second pair of authorities applied based on a second law of authorities as a function of the altitude of the aircraft, the second law of authorities being determined from at least one pair of reference authorities, advantageously from at least three pairs of reference authorities;
- the computing submodule is able to compare each authority of the first pair of authorities with the corresponding authority from the second pair of authorities to determine the maximum authority between said authorities, the first definition and application module and the second definition and application module being configured to respectively apply the maximum authorities determined by the computing submodule;

the control module includes a submodule for determining a flight phase dependent on the angle of climb and/or the pitch of the aircraft, the first definition and application module and the second definition and application module being able to define a command dependent on the flight phase determined by the determination submodule;

it comprises a control assembly capable of commanding at least one movement parameter of the aircraft in a vertical plane, in a lateral plane and/or on the speed axis when the aircraft moves in an autopilot activation domain, the control module being able to be activated to define the recovery maneuver in the autopilot activation domain and outside the autopilot activation domain;

it comprises a third speed command definition and application module of the aircraft, able to control the speed of the aircraft during the recovery maneuver.

The invention also provides to an aircraft autopilot method, including the following steps:

providing a system as defined above;

activating the control module to define the parameters of a recovery maneuver;

computing, via the computing submodule, at least one pair of authorities respectively intended to be applied by the first definition and application module and by the second definition and application module during the recovery maneuver, the authorities being computed based on at least one current movement parameter of the aircraft and a safety parameter;

developing, via the first definition and application module and the second definition and application module, respective load factor and roll commands to implement the recovery maneuver, by applying at least the pair of authorities computed by the computing submodule.

BRIEF SUMMARY OF THE DRAWINGS

The invention will be better understood upon reading the following description, provided solely as an example and done in reference to the appended drawings, in which:

FIG. 1 is a side view of an aircraft including an autopilot system according to an embodiment of the invention, in attitudes, before activating the system to perform a recovery maneuver;

FIG. 2 is a front view of the aircraft of FIG. 1 in attitudes with a large bank angle, before activation of the system;

FIG. 3 is a view similar to FIG. 1 at the end of the recovery maneuver;

FIG. 4 is a view similar to FIG. 2 at the end of the recovery maneuver;

DETAILED DESCRIPTION

Figure 5:
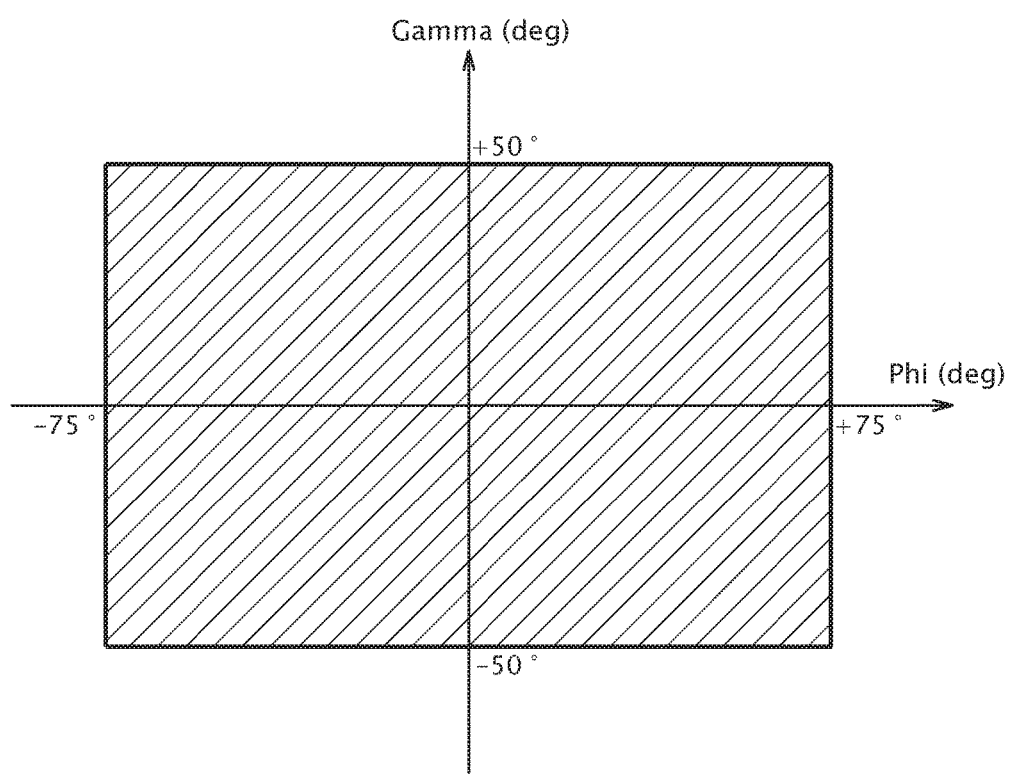
FIG. 5 is a graph illustrating the activation domain of the autopilot.

In the rest of this document, the terms (L1) and (L2) are to be understood relative to the laws of authorities L1, L2 and not relative to a parameter. Thus, a term X(L1) is the term X obtained according to the law of authority L1 and the term X(L2) is the term X obtained according to the law of authority L2.

A first aircraft 10 according to an embodiment of the invention is illustrated by FIGS. 1 to 4. The aircraft 10 comprises at least one engine 12, control surfaces 14 and sensors 16 measuring the orientation, position and movement of the aircraft 10.

The aircraft 10 further includes a cockpit 18, piloting members 20 of the aircraft 10, and an autopilot system 22 according to an embodiment of the invention.

The control surfaces 14 in particular include moving surfaces of the airfoil and the empennage in particular able to affect the angle of climb GAMMA of the aircraft 10, shown in FIG. 1, and its bank angle PHI, shown in FIG. 2.

The control surfaces 14 further include air brakes, able to deploy to reduce the speed of the aircraft.

The measuring sensors 16 in particular include an inertial unit, optionally hybridized with GPS, able to determine the orientation of the aircraft at any moment, in particular the angle of climb and the bank angle of the aircraft, as well as its position, in particular its altitude and its ground speed.

The measuring sensors 16 further include at least one static pressure sensor, and at least one dynamic pressure measurement sensor to determine the calibrated airspeed, or "anemometer", relative to the air in which the aircraft 10 is moving. This also makes it possible to determine the barometric altitude.

The piloting members 20 include a load factor NZ control unit 23A (see FIG. 6), a roll P control unit 23B (see FIG. 6) that are mechanically connected to the control surfaces 16.

The control units can be steered manually by the crew using a control stick located in the cockpit or can be steered by the autopilot system 22 in order to respectively perform a roll command and a load factor command, using the control surfaces 14.

To achieve a given angle of climb or bank angle setpoint, each control unit is able to apply an authority $NZ_{AUT}$, $P_{AUT}$ to perform the maneuver. This authority $NZ_{AUT}$, $P_{AUT}$ is for example expressed in the form of a vertical acceleration regarding the load factor NZ and an angular speed regarding the roll P.

The control units 23A, 23B at most apply one pair of maximal manual piloting authorities $NZ_{AUTmax}$, $P_{AUTmax}$ for manual piloting of the aircraft 10 using a control stick, as a function of the maneuverability of the aircraft 10 and maximum accelerations that can be borne by the occupants of the aircraft.

The maximum load factor authority $NZ_{AUTmax}$ for the load factor is for example less than 3 g and is in particular comprised between 2.2 g and 2.7 g. The maximum roll authority $P_{AUTmax}$ is for example less than 50 deg/s, and is in particular comprised between 35 deg/s and 45 deg/s.

The piloting members 20 further include a control unit 23C, able to be actuated by the crew or by the autopilot system 22 to perform a thrust command for each engine 12, in order to increase the mechanical energy of the aircraft 10, and control unit 23D for deploying the air brakes, so as to decrease the mechanical energy of the aircraft.

Figure 6:
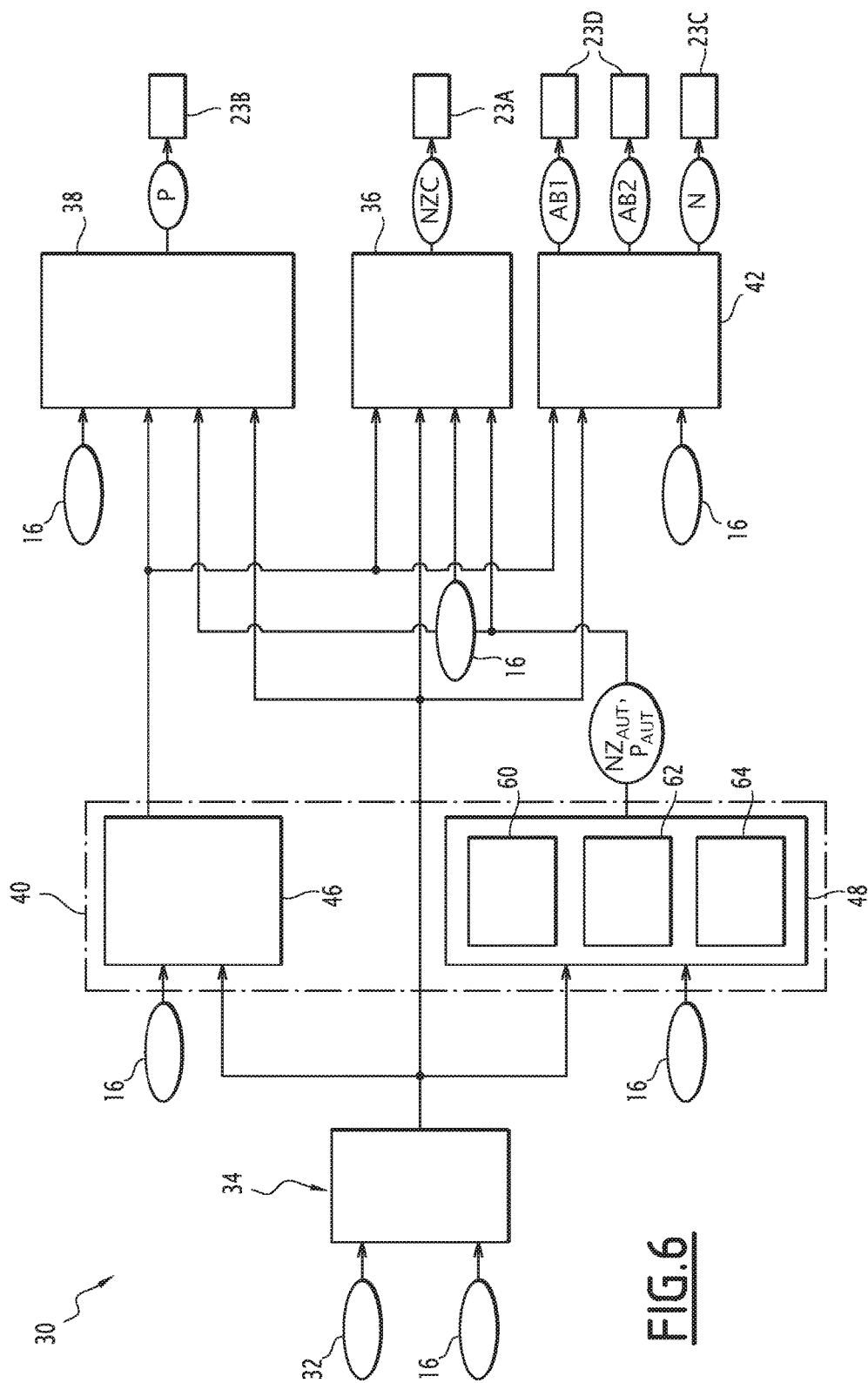
FIG. 6 is a partial diagrammatic view of the autopilot system according to an embodiment of the invention.

The autopilot system 22 includes, in a known manner, a set of controls for the movement of the aircraft in an activation domain 28, defined by the bank angle and angle climb limits, and according to an embodiment of the invention, a recovery assembly 30, shown in FIG. 6, able to be activated within and outside the autopilot activation domain 28.

The autopilot system 22 in particular comprises one or more computers able to house and run software applications relative to the control assembly and the recovery assembly 30.

In the activation domain 28, a command controller in the form of the control assembly of the autopilot system 22 is thus able to automatically steer the control units 23A to 23D to apply at least one setpoint in a vertical plane, such as an altitude setpoint, a setpoint in a lateral plane, such as a heading setpoint and/or a setpoint along the speed axis of the aircraft 10, defined by the crew.

During the use of the control assembly, the control unit of the autopilot system 22 applies a pair of predefined traditional autopilot authorities, $NZ_{AUTn}$; $P_{AUTn}$ for the autopilot of the aircraft 10.

These authorities $NZ_{AUTn}$; $P_{AUTn}$ are below each of the corresponding maximum authorities $NZ_{AUTmax}$; $P_{AUTmax}$ in manual piloting.

The traditional autopilot authority $NZ_{AUTn}$ for the vertical acceleration is for example less than 1.5 g and is in particular comprised between 1.2 g and 1.4 g. The traditional autopilot authority $P_{AUTn}$ for the angular speed is for example less than 20 deg/s, and is in particular comprised between 5 deg/s and 15 deg/s.

The control assembly can be activated by the crew in the nominal domain 28, shown partially in FIG. 5 for the angle of climb and the bank angle. Outside this activation domain 28, the control assembly cannot be activated, and the crew must pilot the aircraft manually.

In the example shown in FIG. 5, the activation domain 28 is limited in terms of angle of climb between a maximum positive angle of climb $GAMMA_{max}$, for example equal to +50°, and a minimum negative angle of climb $GAMMA_{min}$, for example equal to −50°. It is also bounded in terms of bank angle by a maximum bank angle $PHI_{max}$ for example equal to +75° and a minimum bank angle $PHI_{min}$ for example equal to −75°.

In this example, the domain 28 is therefore rectangular in the plane defined by the angle of climb and the bank angle.

According to the invention, the recovery assembly 30 can be activated by the crew or automatically, to perform a recovery maneuver seeking to bring the aircraft 10 back to end-of-maneuver setpoint attitudes, from any initial attitudes.

In this example, the predetermined end-of-maneuver setpoint attitudes include the arrangement of the aircraft 10 with wings level, with a zero bank angle, and leveling, with a zero angle of climb, as illustrated by FIGS. 3 and 4. These predetermined setpoint attitudes are optionally associated with control of the speed axis.

The aircraft 10, in its initial attitudes, before the recovery maneuver, for example has its nose low or a high bank angle, as illustrated by the examples given in FIGS. 1 and 2. The aircraft 10 sometimes moves outside the activation domain 28, in which the control assembly of the autopilot system 12 can be activated.

The recovery assembly 30 is able to be activated manually under the effect of a command 32 from the crew, for example by pressing a physical or virtual button situated in the cockpit 18 of the aircraft 10. It is also able to be activated automatically, for example when the aircraft 10 leaves the activation domain 28.

According to the embodiment of the invention illustrated by FIG. 6, the recovery assembly 30 comprises an activator in the form of an activation module 34, a first load factor command NZC definer and applier in the form of a first load factor command NZC definition and application module 36, and a second load factor command NZC definer and applier in the form of a second roll command P definition and application module 38.

The recovery assembly 30 further includes a controller in the form of a control module 40 of the first module 36 and the second module 38, able to be activated by the activation module 34 to define the characteristics of the recovery maneuver.

The recovery assembly 30 further advantageously includes a third speed command definer and applier in the form of a third speed command definition and application module 42.

The activation module 34 is able to receive an order from the crew requesting the performance of the recovery maneuver, or to be activated automatically when a given movement state of the aircraft is detected, for example outside the activation domain 28.

The activation module 34 is able to activate the control module 40 and send activation information of the recovery mode to each command definition and application module 36, 38, 42.

The control module 40 includes a flight phase determiner in the form of a submodule 46 for determining a flight phase of the aircraft and, according to an embodiment of the invention, a variable maneuvering authorities computer in the form of a submodule 48 for computing variable maneuvering authorities $NZ_{AUT}$; $P_{AUT}$ to be applied, as a function of the risk of leaving an acceptable speed domain for the aircraft 10 and the risk of passing below a safe altitude Zs.

The submodule 46 is able to determine the flight phase of the aircraft 10 chosen from among a plurality of flight phases characterizing the current movement of the aircraft, based on current parameters of the aircraft, measured by the sensors, in particular the angle of climb GAMMA, the pitch attitude THETA, and the bank angle PHI.

The submodule 46 is thus able to produce an indicator of the situation corresponding to a type of emergency maneuver. For example, the situation identified as "Nose down" (characteristic of a situation where the airplane has a moderate to high negative gradient) will lead to a wings-level, then pull up maneuver. The submodule 48 for computing authorities includes a first application 60 for computing a first pair of authorities with respect to the risk of leaving the flight domain, a second application 62 for computing a second pair of authorities with respect to the risk of passing below a given safe altitude, and a third application 64 for comparing authorities computed by the applications 60 and 62 to determine a pair of authorities intended to be sent respectively to the first module 36 and the second module 38.

The first application 60 is able to develop a first law of authorities L1 standardized as a function of the calibrated airspeed Vc of at least one safety parameter here formed by the maximum operating speed. The first application 60 is next able to compute a pair of authorities $NZ_{AUT}(L1)$, $P_{AUT}(L1)$ based on the first law of authorities L1 and the measured current calibrated airspeed Vcm.

Advantageously, the first application 60 is able to develop the first law of authorities L1 based on three pairs of predefined reference authorities, for example, a pair of traditional autopilot authorities, a pair of intermediate authorities, and a pair of maximum manual piloting authorities and a safety parameter here formed by the maximum operating speed VMO/MMO, structurally supported by the aircraft 10. Such a speed is for example defined in paragraph 14 CFR 25.1505 under American law.

Figure 7:
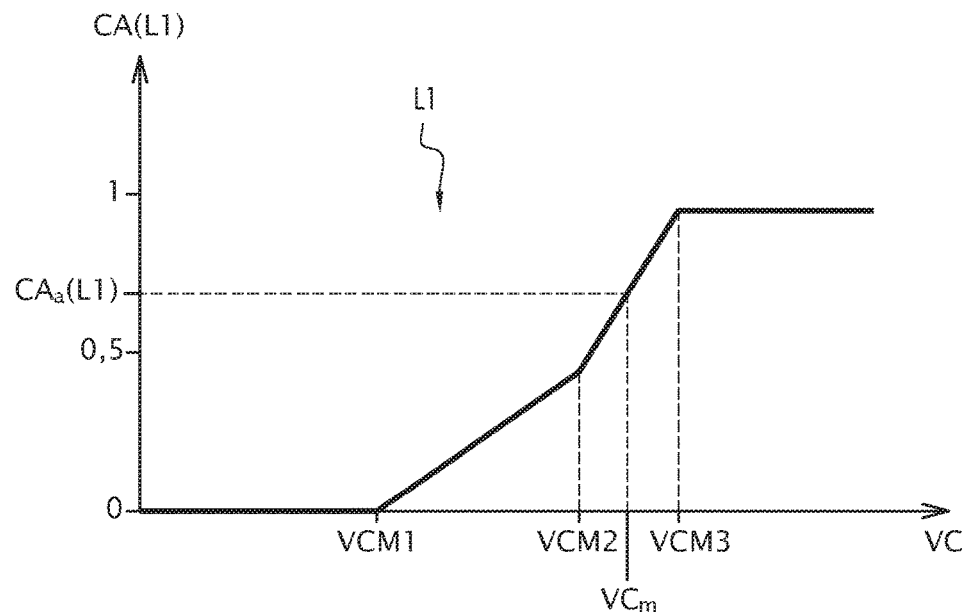
FIG. 7 illustrates a first law of authorities computed based on the current calibrated airspeed.

In the case at hand, as illustrated by FIG. 7, simulated maximum beginning-of-maneuver calibrated airspeed values VCM1, VCM2, VCM3 are respectively determined for the pair of traditional autopilot authorities, the pair of intermediate authorities and the pair of maximum manual piloting authorities, with the measured angle of climb and bank angle.

An authorities coefficient equal to 0 is assigned to the simulated maximum calibrated airspeed VCM1 for the pair of traditional autopilot authorities, an authorities coefficient equal to a value strictly comprised between 0 and 1, for example 0.5, is assigned to the simulated maximum calibrated airspeed VCM2 for the pair of intermediate authorities, and an authorities coefficient equal to 1 is assigned to the simulated maximum calibrated airspeed VCM3 for the pair of maximum manual piloting authorities.

The authorities coefficient CA also varies linearly as a function of the calibrated airspeed Vc between the points thus defined.

Then, the first application 60 is able to compute the authorities coefficient $CA_a(L1)$ to be applied by determining the point of the law of authorities L1 corresponding to the measured calibrated airspeed $VC_m$, at each moment using sensors 16.

The first application 60 is next able to determine a first pair of authorities ($NZ_{AUT}(L1)$, $P_{AUT}(L1)$) by applying a weight equal to the authorities coefficient CAa(L1) obtained between the traditional autopilot authority $NZ_{AUTn}$; $P_{AUTn}$ and the maximum manual piloting authority $NZ_{AUTm}$; $P_{AUTm}$ for example using the equations:

$$NZ_{AUT}(L1)=NZ_{AUTn}\times(1-CA_a(L1))+NZ_{AUTm}\times CA_a(L1);$$

$$P_{AUT}(L1)=P_{AUTn}\times(1-CA_a(L1))+P_{AUTm}\times CA_a(L1).$$

The first application 60 is thus able to define a first pair of authorities ($NZ_{AUT}(L1)$, $P_{AUT}(L1)$), respectively corresponding to the load factor command and the roll command according to the first law of authorities.

The second application 62 is able to define a second standardized law of authorities L2 as a function of the altitude Z of the aircraft, based on attitudes of the aircraft 10 of at least one pair of predetermined reference authorities (load factor; roll), and a safety parameter formed by a predefined safe altitude $Z_s$. The second application 62 is next able to compute a second pair of authorities $NZ_{AUT}(L2)$, $P_{AUT}(L2)$ based on the second law of authorities L2 and the altitude $Z_m$ of the aircraft 10 upon receiving the order.

Advantageously, the second application 62 is able to develop the second law of authorities L2 based on three pairs of predetermined reference authorities, for example, a pair of traditional autopilot authorities, a pair of intermediate authorities, and a pair of maximum manual piloting authorities.

To that end, the second application 62 includes a database of altitude losses DZ between the beginning and end of the recovery maneuver, obtained by simulation, as a function of the attitudes of the aircraft 10, in particular as a function of the angle of climb and the bank angle, and for the predetermined reference authorities.

The second law of authorities L2 is next obtained by the second application 62 by assigning each simulated altitude an authorities coefficient $CA_a(L2)$ comprised between 0 and 1, to define points of the curve of the second law of authorities L2 as a function of the altitude, and defining the evolution of the second law of authorities L2 as a function of the altitude between the points of the curve thus defined.

Figure 8:
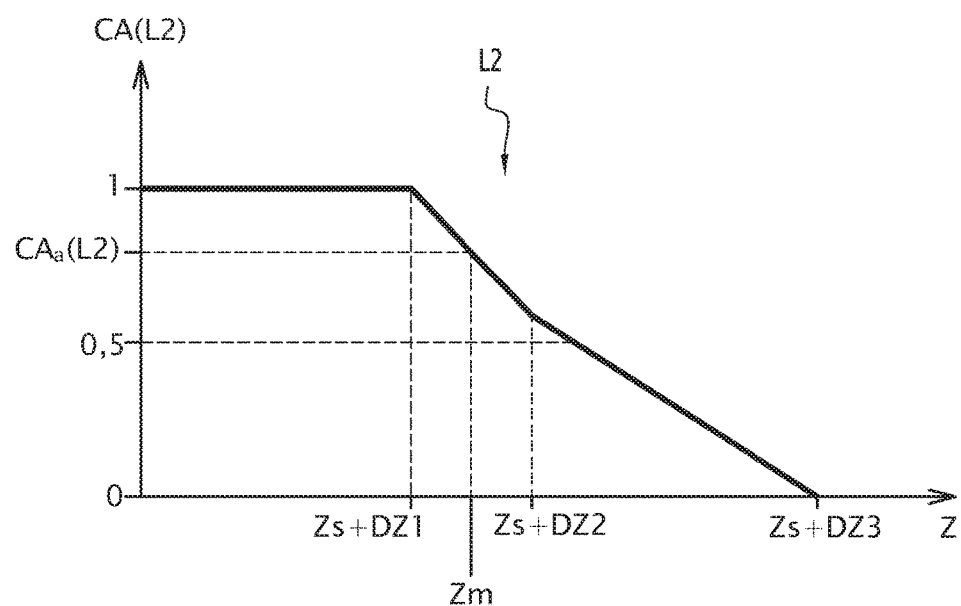
FIG. 8 illustrates a second law of authorities computed based on the current altitude.

In the case at hand, as illustrated by FIG. 8, simulated altitude losses DZ1, DZ2, DZ3 are respectively determined for the pair of traditional autopilot authorities, the pair of intermediate authorities and the pair of maximum manual piloting authorities.

The safe altitude $Z_s$ depends on the current geographical position of the aircraft 10. This altitude $Z_s$ is for example obtained from a geographical database based on the current position measured by the sensors 16.

The authorities coefficient also varies linearly as a function of the altitude between the points thus defined.

Then, the authorities coefficient to be applied $CA_a(L2)$ is obtained by the second application 62 by determining the point of the second law of authorities L2 corresponding to the current measured altitude $Z_m$, using sensors 16.

The second application 62 is next able to determine a second pair of authorities ($NZ_{AUT}(L2)$, $P_{AUT}(L2)$) by applying a weight equal to the authorities coefficient $CA_a(L2)$ obtained between the traditional autopilot authority $NZ_{AUTn}$; $P_{AUTn}$ and the maximum manual piloting authority $NZ_{AUTm}$; $P_{AUTm}$ for example using the formulas:

$$NZ_{AUT}(L2)=NZ_{AUTn}\times(1-CA_a(L2))+NZ_{AUTm}\times CA_a(L2);$$

$$P_{AUT}(L2)=P_{AUTn}\times(1-CA_a(L2))+P_{AUTm}\times CA_a(L2).$$

The second application 62 is thus able to define a second pair of authorities ($NZ_{AUT}(L2)$, $P_{AUT}(L2)$), respectively corresponding to the load factor command and the roll command.

The third comparison application 64 is able to compare the authority $NZ_{AUT}(L1)$ obtained for the load factor command using the first application 60 and the corresponding authority $NZ_{AUT}(L2)$ obtained using the second application 62, to define a computed authority $NZ_{AUT}$ for the load factor command chosen as the largest among the authorities $NZ_{AUT}$(L1) and $NZ_{AUT}(L2)$.

Likewise, the third comparison application 64 is able to compare the authority $P_{AUT}(L2)$ obtained for the roll command using the first application 60 and the corresponding authority $P_{AUT}(L2)$ obtained using the second application 62, to define a computed authority $NZ_{AUT}$ for the roll command chosen as the largest among the authorities $P_{AUT}$(L1) and $P_{AUT}(L2)$.

A pair ($NZ_{AUT}$, $P_{AUT}$) of authorities is thus obtained using the third comparison application 64.

The defined authorities $NZ_{AUT}$, $P_{AUT}$ are variable to assume an optimal value comprised between a traditional autopilot authority and a maximum manual piloting authority of the aircraft. Thus, the authority computing submodule 48 performs an authority computation that adapts perfectly to the maneuver to be done taking into account the severity of the situation, and the risk of leaving the speed domain or passing below a safe altitude, while minimizing discomfort for occupants of the aircraft.

The first load factor command NZC definition and application module 36 is able to define a command of the load factor, as a function of the movement phase of the aircraft 10, determined by the determination submodule 46, the measured load factor NZ, and the authority $NZ_{AUT}$ computed from the submodule 48.

The first module 36 is next able to send this command to the load factor control unit 23A.

The second roll command P definition and application module 38 is able to define a command of the roll P, as a function of the movement phase of the aircraft determined by the determination submodule 46, as a function of the measured roll PHI, and the authority PAUT computed by the submodule 48, to achieve a bank angle setpoint PHICOM in the predetermined setpoint attitudes at the end of the recovery maneuver.

The second module 38 is next able to send this command to the roll control unit 23B.

When it is present, the third module 42 is able to develop air brake deployment commands AB1, AB2, to decrease the mechanical energy of the aircraft 10, or engine commands N to adapt the mechanical energy of the aircraft 10, in order to keep the aircraft 10 in an acceptable speed range.

The load factor command NZC and/or the roll command P are applied simultaneously and/or offset over time as a function of the movement phase of the aircraft 10 obtained using the submodule 46.

A first autopilot method according to an embodiment of the invention, implemented using the autopilot system 22, will now be described.

Initially, when the crew is disoriented or when the aircraft 10 experiences a major alteration of its movement, in particular when passing through wake turbulence, it gives an order to implement the recovery maneuver, for example by pressing a physical or virtual button present in the cockpit 18. Alternatively, the order is triggered automatically, based on the attitudes of the aircraft.

According to an embodiment of the invention, this order may be triggered when the aircraft is in the activation domain 28, or outside that domain 28, in which the crew must manually pilot the aircraft 10.

The activation order 32 is received by the activation module 34, which activates the command module 40 and informs the definition and application module 36, 38, 42 of the reception of the order.

The submodule 46 then determines the current movement phase of the aircraft based on the current flight parameters, such as the angle of climb GAMMA, the bank angle PHI.

The first computation application 60 of the submodule 48 next develops the first law of authorities L1, based on the current angle of climb and bank angle, using the maximum calibrated airspeed.

The first computation application 60 next successively computes an authorities coefficient $CA_a(L1)$ from the first law of authorities L1 for the measured calibrated airspeed $VC_m$, and a first pair of authorities ($NZ_{AUT}(L1)$, $P_{AUT}(L1)$) obtained by weighting between the traditional autopilot authority and the maximum manual piloting authority as a function of the computed authorities coefficient $CA_a(L1)$.

In parallel, the second computation application 62 of the submodule 48 develops the second law of authorities L2, based on the current angle of climb and bank angle, and based on the safe altitude $Z_s$.

The second computation application 62 next successively computes an authorities coefficient $CA_a(L2)$ from the second law of authorities L2 for the measured altitude $VC_m$, and a second pair of authorities ($NZ_{AUT}(L2)$, $P_{AUT}(L2)$) obtained by weighting between the traditional autopilot authority and the maximum manual piloting authority as a function of the computed authorities coefficient $CA_a(L2)$.

The third comparison application 64 compares the individual authorities of each of the pairs of authorities and develops the load factor command authority $NZ_{AUT}$ and the roll command authority $P_{AUT}$, taking the maximum of the respective individual authorities $NZ_{AUT}(L1)$; $NZ_{AUT}(L2)$ and $P_{AUT}(L1)$; $P_{AUT}(L2)$ obtained by the first application 60 and the second application 62.

The authorities $NZ_{AUT}$ and $P_{AUT}$ are next respectively transmitted to the first definition and application module 36 and the second definition and application module 38.

The first module 36 determines a load factor command NZ as a function of the measured load factor NZ, the movement phase of the aircraft, and the authority $NZ_{AUT}$ computed by the submodule 48. The second module 38 sends this command to the load factor control unit 23A, which maneuvers the control surfaces 14 accordingly.

The second module 38 simultaneously determines a roll command P as a function of the desired end-of-maneuver roll setpoint PHICOM, the measured roll PHI, the movement phase of the aircraft and the authority $P_{AUT}$ computed from the submodule 48. The second module 38 sends this command to the roll control unit, which maneuvers the control surfaces 14 accordingly.

Optionally, the third module 42 controls the calibrated airspeed of the aircraft during the maneuver, by developing control orders AB1, AB2 to deploy the air brakes, if the calibrated airspeed Vc is too high, or developing control orders N for each engine 12.

The recovery maneuver is therefore implemented taking into account the risk of leaving the speed domain, in particular by avoiding passing below a maximum operating speed (VMO/MMO), and the risk of passing below a safe altitude, and by incorporating these risks into the severity of the necessary maneuver.

The command authorities of the load factor $NZ_{AUT}$ and the roll $P_{AUT}$ are computed as a function of the attitudes of the aircraft 10 during the initiation of the maneuver and as a function of the severity of the maneuver, which minimizes the effects felt by the occupants of the aircraft. In particular, the discomfort of the maneuver for passengers is minimized.

Furthermore, the recovery maneuver may be activated in the traditional usage domain of the autopilot system 22 or outside that domain, irrespective of the attitudes of the aircraft.

This mode may be initiated manually by the crew or automatically when the system detects a departure from the traditional usage domain of the autopilot system 22.

Once the maneuver is done, the system 12 can then return to a traditional autopilot mode.

What is claimed is:

1. An autopilot system for an aircraft comprising:
a first load factor command definer and applier;
a second roll command definer and applier; and
a controller of the first definer and applier and the second definer and applier, the controller being configured to define parameters of a recovery maneuver seeking to return the aircraft to setpoint attitudes at the end of a maneuver from initial attitudes, the controller including a computer for computing at least one pair of authorities respectively applied by the first definer and applier and by the second definer and applier during the recovery maneuver, the at least one pair of authorities comprising a load factor authority and a roll authority, the authorities being computed based on at least one current movement parameter of the aircraft and a safety parameter,
the first load factor command definer and applier determining a load factor command as a function of the load factor authority,
the second roll command definer and applier determining a roll command as a function of the roll authority.

2. The system according to claim 1, wherein each applied authority is computed to assume a value comprised between a traditional autopilot authority of the aircraft and a maximum manual piloting authority of the aircraft.

3. The system according to claim 1, wherein the or each movement parameter of the aircraft is determined successively during the maneuver, the computer being configured to compute the at least one pair of authorities, based on the or each current movement parameter.

4. The system according to claim 1, wherein the movement parameter is chosen from among the angle of climb, the bank angle, the calibrated airspeed, and/or the altitude of the aircraft.

5. The system according to claim 1, wherein predetermined end-of-maneuver setpoint attitudes are a zero angle of climb and a zero bank angle.

6. The system according to claim 1, wherein the computer is configured to compute a pair of authorities applied as a function of a measured calibrated airspeed of the aircraft.

7. The system according to claim 6, wherein the safety parameter is a maximum operating speed of the aircraft.

8. The system according to claim 6, wherein the computer is configured to determine the first pair of authorities applied based on a first law of authorities as a function of a measured calibrated airspeed of the aircraft, the first law of authorities being determined from at least one pair of reference authorities.

9. The system according to claim 8, wherein the first law of authorities is determined from at least three pairs of reference authorities.

10. The system according to claim 6, wherein the computer is configured to compute a second pair of authorities applied as a function of a measured altitude of the aircraft, the computer being configured to compare each authority of the first pair of authorities with the corresponding authority from the second pair of authorities to determine the maximum authority between said authorities, the first definer and applier and the second definer and applier being configured to respectively apply the maximum authorities determined by the computer.

11. The system according to claim 1, wherein the computer is configured to compute a second pair of authorities applied as a function of a measured altitude of the aircraft.

12. The system according to claim 11, wherein the safety parameter is a safe altitude.

13. The system according to claim 11, wherein the computer is configured to determine the second pair of authorities applied based on a second law of authorities as a function of the altitude of the aircraft, the second law of authorities being determined from at least one pair of reference authorities.

14. The system according to claim 13, wherein the second law of authorities is determined from at least three pairs of reference authorities.

15. The system according to claim 1, wherein the controller includes a flight phase determiner for determining a flight phase dependent on the angle of climb and/or the pitch of the aircraft, the first definer and applier and the second definer and applier being configured to define a command dependent on the flight phase determined by the flight phase determiner.

16. The system according to claim 1, comprising a command controller configured for commanding at least one movement parameter of the aircraft in a vertical plane, in a lateral plane and/or on the speed axis when the aircraft moves in an autopilot activation domain, the controller of the first definer and applier and the second definer and applier being configured to be activated to define the recovery maneuver in the autopilot activation domain and outside the autopilot activation domain.

17. The system according to claim 1, comprising a third speed command definer and applier of the aircraft, configured to control the speed of the aircraft during the recovery maneuver.

18. An autopilot method for an aircraft comprising:
providing an autopilot system for an aircraft comprising:
a first load factor command definer and applier;
a second roll command definer and applier; and
a controller of the first definer and applier and the second definer and applier, the controller being configured to define parameters of a recovery maneuver seeking to return the aircraft to setpoint attitudes at the end of a maneuver from initial attitudes, the controller includes including a computer for computing at least one pair of authorities respectively applied by the first definer and applier and by the second definer and applier during the recovery maneuver, the at least one pair of authorities comprising a load factor authority and a roll authority, the authorities being computed based on at least one current movement parameter of the aircraft and a safety parameter,
the first load factor command definer and applier determining a load factor command as a function of the load factor authority,
the second roll command definer and applier determining a roll command as a function of the roll authority;
activating the controller to define the parameters of the recovery maneuver;
computing, via the computer, at least one pair of authorities respectively intended to be applied by the first definer and applier and by the second definer and applier during the recovery maneuver, the authorities being computed based on the at least one current movement parameter of the aircraft and the safety parameter; and
developing, via the first definer and applier and the second definer and applier, respective load factor and roll commands to implement the recovery maneuver, by applying at least the pair of authorities computed by the computer.

19. An autopilot system for an aircraft comprising:
a first load factor command definer and applier;
a second roll command definer and applier; and
a controller of the first definer and applier and the second definer and applier, the controller being configured to define parameters of a recovery maneuver seeking to return the aircraft to setpoint attitudes at the end of a maneuver from initial attitudes,
the controller including a computer for computing at least one pair of authorities respectively applied by the first definer and applier and by the second definer and applier during the recovery maneuver, the authorities being computed based on at least one current movement parameter of the aircraft and a safety parameter;
the computer being configured to compute a first pair of authorities applied as a function of a measured calibrated airspeed of the aircraft;
the computer being configured to compute a second pair of authorities applied as a function of a measured altitude of the aircraft, the computer being configured to compare each authority of the first pair of authorities with the corresponding authority from the second pair of authorities to determine the maximum authority between said authorities, the first definer and applier and the second definer and applier being configured to respectively apply the maximum authorities determined by the computer.

\* \* \* \* \*